United States Patent Office 2,815,380
Patented Dec. 3, 1957

2,815,380

4-(6-ETHYL-2,6-DIMETHYL-2-CYCLOHEXENYL)-3-BUTEN-2-ONE

Joseph Donald Surmatis, Pompton Plains, N. J., assignor to Hoffmann-La Roche Inc., Nutley, N. J., a corporation of New Jersey No Drawing. Application September 29, 1954,
Serial No. 459,212

1 Claim. (Cl. 260—587)

This invention relates to a novel chemical compound and to a novel method of preparing the same. More particularly, it relates to 4-(6-ethyl-2,6-dimethyl-2-cyclohexenyl)-3-buten-2-one, and to a process of preparing the same which comprises cyclizing 6,10-dimethyl-3,5,9-dodecatrien-2-one by treating the latter with phosphoric acid. 4-(6-ethyl-2,6-dimethyl-2-cyclohexenyl)-3-buten-2-one is useful as an odor-imparting agent in the preparation of perfumes and of scented compositions generally. The invention therefore finds particular application in the perfume, cosmetic and pharmaceutical industries.

A preferred method of preparing the novel compound of the invention comprises mixing 6,10-dimethyl-3,5,9-dodecatrien-2-one with syrupy aqueous phosphoric acid, e. g. by mixing the ketone starting material with aqueous phosphoric acid of about 85% by weight concentration at very moderately elevated temperatures.

The starting material, 6,10-dimethyl-3,5,9-dodecatrien-2-one, is itself a novel substance, but this compound and its preparation are not claimed herein. Nevertheless, in order that the instant disclosure may be complete, the preparation of the starting material is described below:

PREPARATION OF 6,10-DIMETHYL-3,5,9-DODECATRIEN-2-ONE

600 g. of 3-methyl-1-penten-3-ol was cooled to $+15°$ C. with an ice bath, then 1800 cc. of concentrated aqueous hydrochloric acid (37%) was poured into the reaction vessel. The mixture was stirred for 30 minutes. The oil, comprising essentially 1-chloro-3-methyl-2-pentene, was separated, washed three times with 500 cc. of water and dried over calcium chloride.

Four liters of benzene, 1040 g. of ethyl acetoacetate and 378 g. of sodium methylate were stirred into a 12 liter flask. 696 g. of 1-chloro-3-methyl-2-pentene as produced in the preceding paragraph was added from a separatory funnel in 2 hours at 60° C. The stirring was then continued at 60° C. overnight.

The mixture was diluted with four liters of water. The oil was separated and the benzene was distilled off under vacuum. The thick residue, 3-carbethoxy-6-methyl-5-octen-2-one, was placed in a 5 liter flask with 2 liters of ethyl alcohol, 1 liter of water and 500 grams of potassium hydroxide. This was stirred for two hours, then allowed to set overnight, thereby forming the potassium salt of 3-carboxy-6-methyl-5-octen-2-one.

Concentrated hydrochloric acid was added to the stirred reaction mixture from a separatory funnel until strongly acid. The oil layer was removed, and the aqueous portion was extracted with one liter of benzene. The combined oils were water washed and fractionated to yield 6-methyl-5-octen-2-one, distilling at 65° C./10 mm., $n_D^{25}=1.4412$.

84 g. of metallic sodium was dissolved in 3 liters of liquid ammonia. Acetylene was bubbled into the stirred solution until its color changed from blue to a white. 420 g. of 6-methyl-5-octen-2-one was dissolved in 500 cc. of diethyl ether and dropped into the stirred reaction mixture in one hour. Stirring was then continued for 3 hours while a slow stream of acetylene was bubbled in.

The acetylene was then stopped, but the stirring was continued for about 15 hours. The ammonia was then distilled off and the residue in the reaction vessel was washed with 2 liters of 5% aqueous sulfuric acid. The product was then water washed, dried over anhydrous calcium sulfate and fractionated to yield 3,7-dimethyl-6-nonen-1-yn-3-ol, distilling at 89° C./10 mm., $n_D^{25}=1.4612$.

300 g. of 3,7-dimethyl-6-nonen-1-yn-3-ol, 30 g. of 5% lead-palladium-calcium carbonate catalyst [Lindlar, Helvetica Chimica Acta 35, 446 (1952)] and 300 cc. of petroleum ether were placed in a flask provided with a stirrer and hydrogenated at 25–30° C. at one atmosphere hydrogen pressure until 1.9 mols of hydrogen were consumed. Fractionation of the product gave 3,7-dimethyl-1,6-nonadien-3-ol distilling at 132° C./88 mm., $$n_D^{25}=1.4603.$$

In a flask fitted with a stirrer, thermometer, dropping funnel, and a cold water bath, were placed 1500 cc. of water, 250 g. of sodium dichromate, 125 cc. of glacial acetic acid, 200 cc. of benzene, and 125 g. of 3,7-dimethyl-1,6-nonadien-3-ol. To the stirred reaction mixture was added a solution of 125 cc. of concentrated sulfuric acid in 400 cc. of water over a period of two hours. During the addition, the temperature was controlled at 40° C. The stirring was continued for an additional hour; then one liter of water was added. The oil layer was removed with a separatory funnel, and the aqueous layer was extracted with 400 cc. of benzene. The oil and benzene extracts were combined and washed until neutral. The oil was distilled through a column under vacuum. The product, 3,7-dimethyl-2,6-nonadien-1-al, distilled at 135–137° C./25 mm., $n_D^{25}=1.4830$. The semicarbazone derivative melted at 159° C.

45 g. of 3,7-dimethyl-2,6-nonadien-1-al, 50 g. of aluminum isopropylate, 600 cc. of acetone and 600 cc. of benzene were placed in a 2 liter flask and stirred at reflux temperature for 24 hours. The cooled reaction mixture was washed first with dilute hydrochloric acid and finally with water until neutral. The benzene was distilled off, and the product was fractionated under high vacuum, the desired product 6,10-dimethyl-3,5,9-dodecatrien-2-one being obtained in a fraction distilling at 102–103° C./0.2 mm., $n_D^{25}=1.5223$. The 2,4-dinitrophenyl-hydrazone derivative melted at 117° C.

The invention is further disclosed in the following example, which is illustrative but not limitative thereof:

*Example*

51.4 g. of 6,10-dimethyl-3,5,9-dodecatrien-2-one was added drop by drop to 386 g. of 85% aqueous phosphoric acid with vigorous stirring. The addition was made in 30 minutes, while the temperature was kept at 30–35° C. The reaction product was poured into 1500 cc. of cold water. The product was extracted with benzene and the extract was subjected to steam distillation. The distillate was benzene extracted, and the extract was fractionated. 4-(6-ethyl-2,6-dimethyl-2-cyclohexenyl)-3-buten-2-one was obtained as a fraction distilling at 73° C./0.10 mm., $n_D^{25}=1.497$. The 2,4-dinitrophenylhydrazone derivative melted at 160° C. 4-(6-ethyl-2,6-dimethyl-2-cyclohexenyl)-3-buten-2-one has a pleasant fragrance reminiscent of that of orris root.

I claim:

4-(6-ethyl-2,6-dimethyl-2-cyclohexenyl)-3-buten-2-one.

References Cited in the file of this patent

Simonsen et al.: The Terpenes, vol. I, 1947, Cambridge University Press, pp. 122–123.

West et al.: Synthetic Perfumes, pp. 175–178 (1949).

Moncrieff: The Chemistry of Perfumery Materials, pp. 98, 99 (1949).